(No Model.) 2 Sheets—Sheet 2.

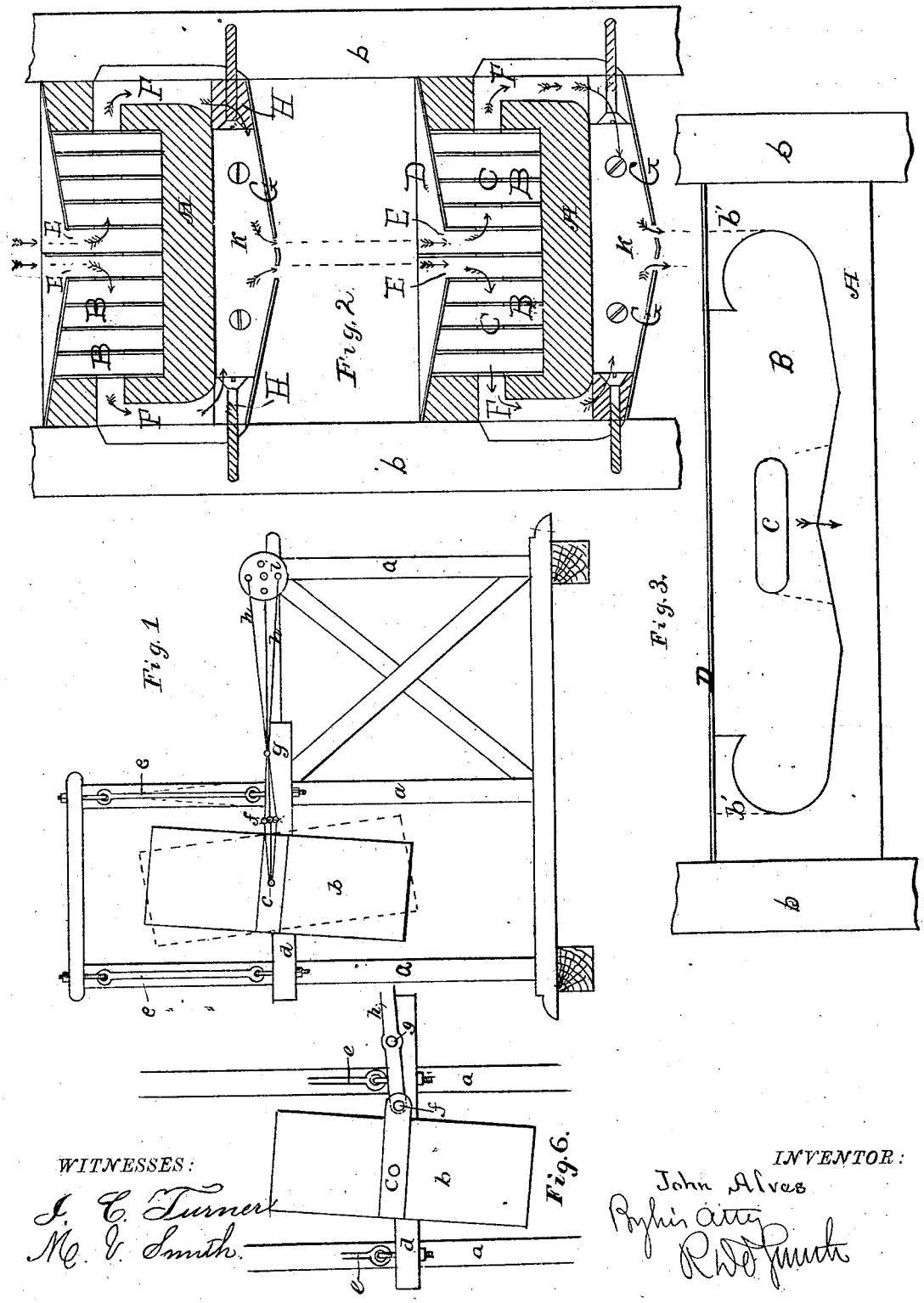

J. ALVES.
AMALGAMATOR.

No. 273,003. Patented Feb. 27, 1883.

Witnesses:
J. C. Turner
M. V. Smith

Inventor:
John Alves
By his Atty R. D. O. Smith

UNITED STATES PATENT OFFICE.

JOHN ALVES, OF DUNEDIN, NEW ZEALAND.

AMALGAMATOR.

SPECIFICATION forming part of Letters Patent No. 273,003, dated February 27, 1883.

Application filed November 7, 1882. (No model.)

*To all whom it may concern:*

Be it known that I, JOHN ALVES, of George Street, Dunedin, in the Colony of New Zealand, engineer, have invented new and useful Improvements in Amalgamators, of which the following is a specification.

My amalgamator is of peculiar construction and has a peculiar motion imparted to it. It consists of a series of boxes—one for each stamp in the battery—connected together and inclosed in one common casing. Each box contains one, two, three, or more sets of contrivances, one below the other, as may be preferred. Each of these sets of contrivances is made up, first, of a top plate, having one or more rows of holes or perforations along its longitudinal center, below which is a series of vertical amalgamating-plates resting upon a curved bottom, thus forming a series of troughs, the only exit from each of which is through a hole in the center of each plate, so as to provide a passage from the center to each side of these sets of contrivances, where downward passages conduct to a second set of contrivances identical with those just described, and under the second there may be a third, and so on, multiplying them as much as may be desired, although I have found five of these sets a useful and practicable number. The lowermost of these sets discharges onto a distributing-table and from thence onto an endless traveling blanket table or any other suitable concentrator; or the distributing-table might be dispensed with and the amalgamator discharge itself directly onto the blanket table.

In order, however, that my invention may be clearly understood, I will now proceed to describe the drawings attached hereto, in which—

Figure 5:
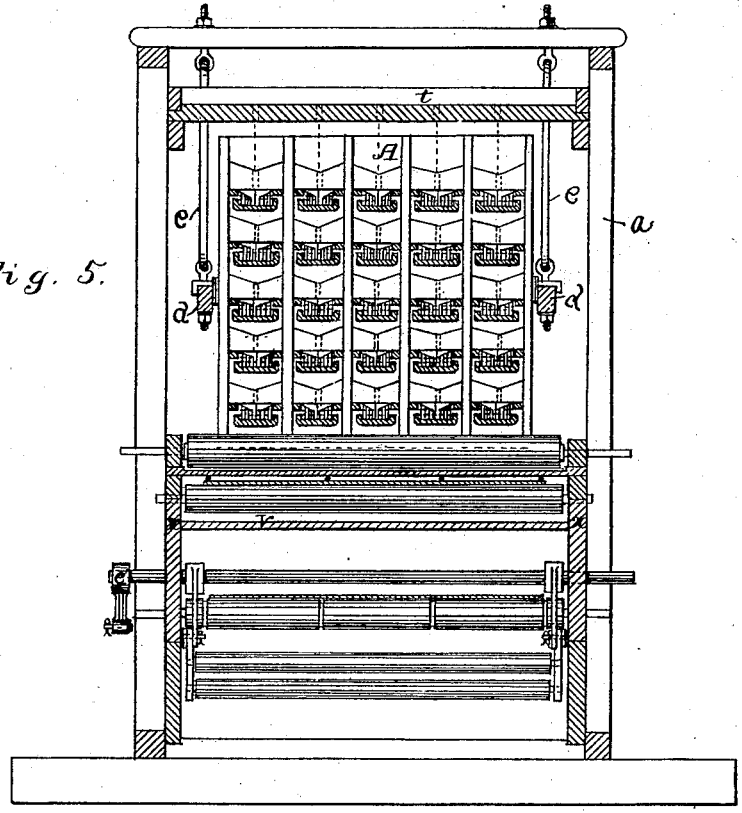
Figure 4:
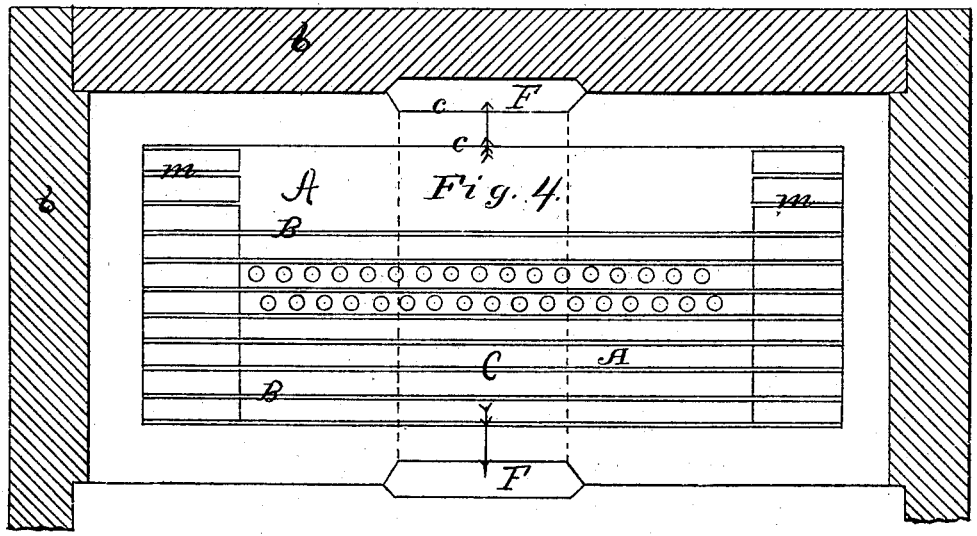

Figure 1 shows a side elevation of one of my amalgamators; Fig. 2, a transverse section of a part of same; Fig. 3, a longitudinal section, showing face view of the amalgamating-plates; Fig. 4, a plan of one set of contrivances in amalgamator; and Fig. 5 is a cross-section of amalgamator and concentrator underneath. Fig. 6 is an elevation showing the structure and operation of the device for swinging and tilting the amalgamator-box.

Referring to Fig. 1, *a* is the framing; *b*, the amalgamating-box; *c*, the trunnion or bearing pin of box. *d* represents the swinging bars of the box. *e* represents the hangers of swinging bars. *f* is an arm projecting from the box and jointed to the end of connecting-rod *h*. *g* is a fulcrum on the swinging bars for connecting-rod to give the rocking motion to the amalgamator-box; *h h*, the connecting-rod to crank; *i*, a crank-plate or eccentric, whereby the box *b* is caused to swing or rock. A, Fig. 2, is the wooden support or box for amalgamating-plates. B represents the amalgamating-plates set vertically in said box A, thus utilizing both sides. C C are discharge-holes through said plates. D is a horizontal amalgamating-plate to cover in the vertical plates; E E, openings or holes to let the feed enter the amalgamator; F F, passages to allow the overflow to escape on each side from the amalgamator. G G are perforated plates to convey the overflow into the center of the amalgamator below, as shown by the arrows; H H, fillets to keep the wooden supports A in position and to allow them to be drawn out when required. *b b* are the sides of amalgamator-box; *k k*, fillets to hold the perforated plate in position.

B is one of the vertical amalgamating-plates, and *b'* its ends. C are its discharge-apertures. D is the horizontal amalgamating-plate or cover over the vertical plates.

*m m* are slots in the wooden support A to allow the vertical plates B to drop into position, so as to admit of their being easily taken out to clean off the amalgam. One side of the box *b* may be made to open like a door, to allow the amalgamators to be drawn out when required.

The mode of operation is as follows: The whole apparatus is so set as that the discharge of each stamp in a battery is conducted to the top of one of the compartments in my amalgamating-box, and so as that the discharge from the amalgamator-boxes is received on the distributing-table, (see Fig. 5,) by which it is conducted to the upper face of the endless traveling blanket table in my washer or concentrator, described and claimed in my application No. 75,399. Provision is also made for revolving the spindle of crank *i*. When thus ready for working the crushed material from the stampers flows with a regular supply of water into the top of the amalgamators, runs through the perforations G, along the center of the top plate, D, and falls into the central troughs between the vertical amalgamating-plates B. In these troughs it is swayed about by the motion of the amalgamator as a whole, and, passing from trough to trough through the perforations C in both directions in regular succession, is finally discharged into the passages F, and thence onto plate G through perforations, in the center of which it discharges into a similar set of contrivances to those just described, and from this set to a third, and so on to as many as may be thought desirable, although I have found five sets, as shown in the drawings, Fig. 5, to work admirably. This discharge from each compartment of my amalgamator is received on a distributing-table, from whence it passes to any suitable washing and concentrating contrivance. When the amalgamator is sufficiently charged it must be cleaned out, and if the amalgamating-plates become dirty they must be cleaned and renewed or resilvered, as the case may be, the gold in the form of amalgam being found mostly on the vertical plates of the amalgamators, while the pyrites and other valuable material will be found deposited in the bottom of the washer.

If so preferred, the feed might be at the side of each compartment of the amalgamator instead of in the middle, as hereinbefore described, and the material would then have to travel to the opposite side of the box before it could be discharged. This of course would give it a longer time for treatment; and, again, the motion imparted to the amalgamator as a whole and the contrivances for giving such motion might be altered or varied; but as regards each of these variations I prefer the mode shown in my drawings and hereinbefore described.

Having thus described the nature of my invention and the method of putting it into practical operation, I would have it understood that what I claim as my improvements in amalgamators is—

1. The combination of the amalgamating-box $b$, bearing or trunnion pin $c$, swinging bars $d$, arm $f$, rod $h$, and crank $i$, substantially as described, and for the purposes set forth.

2. The box or support A, provided with perforated vertical amalgamating-plates B, cover D, and overflow-openings F F, the cover-plates D being placed on the incline, substantially as described, and for the purposes set forth.

3. In an amalgamator, the box A, vertical perforated plates B, incline cover D, and openings F F, in combination with perforated plates G, whereby the overflow from amalgamators B is conveyed to the center of the amalgamator below.

4. In an amalgamator, the combination of the box A, vertical perforated plates B, incline cover D, fillets H, and perforated plates G, substantially as described, and for the purpose set forth.

5. In an amalgamator, the combination of the box A, vertical perforated plates B, incline cover D, and fillets H and K, substantially as described, and for the purposes set forth.

6. In an amalgamator, the box A, provided with slots $m$, adapted to receive the lower edge of the vertical perforated plates B, the covers D, and overflow-openings F, substantially as described.

7. In an amalgamator, the framing $a$, provided with amalgamating-box $b$, said box being provided with a series of vertical perforated amalgamating-plates, B, covered by incline plates D, each of the series of amalgamating plates being contained in a box, A, provided with overflow-openings F, each of said boxes being separated by intervening perforated plates G, the box $b$ being pivotally mounted, whereby it may be given a rocking motion, as set forth.

JOHN ALVES.

Witnesses:
ARCHIBALD HILSON ROSS,
ERNEST ALFRED ROSS.